(12) United States Patent
Foote et al.

(10) Patent No.: US 7,780,328 B2
(45) Date of Patent: Aug. 24, 2010

(54) HEAT DISTRIBUTION IN A DISTRIBUTED LIGHTING APPARATUS

(75) Inventors: Peter David Foote, Trellech (GB); Christopher Stace, Filton (GB); Leslie Charles Laycock, High Ongar (GB)

(73) Assignee: BAE Systems Plc, London (GB)

( * ) Notice: Subject to any disclaimer, the term of this patent is extended or adjusted under 35 U.S.C. 154(b) by 308 days.

(21) Appl. No.: 11/910,592

(22) PCT Filed: Jul. 12, 2007

(86) PCT No.: PCT/GB2007/050396

§ 371 (c)(1), (2), (4) Date: Oct. 3, 2007

(87) PCT Pub. No.: WO2008/007142

PCT Pub. Date: Jan. 17, 2008

(65) Prior Publication Data

US 2009/0279323 A1    Nov. 12, 2009

(30) Foreign Application Priority Data

Jul. 14, 2006   (EP) .................................. 06253699
Jul. 14, 2006   (GB) .................................. 0614036.2

(51) Int. Cl.
*F21V 5/00* (2006.01)
(52) U.S. Cl. ........................... 362/580; 362/562; 362/96
(58) Field of Classification Search ................. 362/580, 362/562, 89, 96; 416/5, 224, 229 R
See application file for complete search history.

(56) References Cited

U.S. PATENT DOCUMENTS

| 4,422,180 | A |   | 12/1983 | Wendt |         |
|-----------|---|---|---------|-------|---------|
| 4,704,660 | A | * | 11/1987 | Robbins | 362/552 |
| 5,233,679 | A | * | 8/1993  | Oyama | 385/146 |
| 5,315,683 | A | * | 5/1994  | Miller | 385/136 |
| 5,774,088 | A |   | 6/1998  | Kreithen |      |
| 5,947,418 | A | * | 9/1999  | Bessiere et al. | 244/134 D |
| 6,078,714 | A | * | 6/2000  | Cavanaugh | 385/115 |
| 2002/0067274 | A1 | | 6/2002 | Haller |         |

(Continued)

FOREIGN PATENT DOCUMENTS

DE    195 28 862 A1    2/1997

(Continued)

OTHER PUBLICATIONS

European Search Report dated Nov. 20, 2006.

(Continued)

*Primary Examiner*—Sandra L O'Shea
*Assistant Examiner*—Evan Dzierzynski
(74) *Attorney, Agent, or Firm*—Buchanan Ingersoll & Rooney PC

(57) ABSTRACT

Described herein is an apparatus which is, under a range of atmospheric conditions, capable of maintaining the emission of light at a point remote from a light source. Notably, the apparatus is able to heat and distribute a fluid, and by doing so, prevents condensation and ice from forming which could hamper the emission of light. The apparatus comprises a light source and a light emitter, with a light conduit and a fluid conduit running between.

A method for using such apparatus is also described.

12 Claims, 1 Drawing Sheet

U.S. PATENT DOCUMENTS

| | | | |
|---|---|---|---|
| 2004/0041408 A1* | 3/2004 | Casazza ..................... | 290/55 |
| 2004/0174542 A1 | 9/2004 | Handman et al. | |
| 2005/0134050 A1 | 6/2005 | Salls, Jr. | |
| 2005/0249595 A1 | 11/2005 | Wobben | |

FOREIGN PATENT DOCUMENTS

| | | |
|---|---|---|
| DE | 196 21 485 A1 | 3/1998 |
| DE | 201 01 375 U1 | 6/2001 |
| DE | 201 10 825 U1 | 12/2001 |
| DE | 201 11 539 U1 | 12/2001 |
| DE | 101 59 990 A1 | 6/2003 |
| DE | 101 60 360 A1 | 6/2003 |
| DE | 103 48 994 A1 | 5/2005 |
| EP | 0 046 875 A2 | 3/1982 |
| EP | 1 375 913 A | 1/2004 |
| EP | 1 466 827 A2 | 10/2004 |
| GB | 2 158 939 A | 11/1985 |
| GB | 2325452 A | 5/2001 |
| JP | 55-23372 A | 2/1980 |
| JP | 8 50207 A | 2/1996 |
| JP | 10 300860 A | 11/1998 |
| NO | 2004/02395 A | 12/2005 |
| WO | WO 01/33179 A1 | 5/2001 |
| WO | WO 02/052223 A1 | 7/2002 |
| WO | WO 03/050412 A | 6/2003 |
| WO | WO 03/052973 A1 | 6/2003 |
| WO | WO 03/104648 A1 | 12/2003 |
| WO | WO 03/104649 A1 | 12/2003 |
| WO | WO 2005/071382 A1 | 8/2005 |
| WO | WO 2005/071383 A1 | 8/2005 |

OTHER PUBLICATIONS

United Kingdom Search Report dated Nov. 15, 2006.
International Preliminary Report on Patentability and Written Opinion of the International Searching Authority issued in corresponding International Patent Application No. PCT/GB2007/050396 dated Jan. 14, 2009, The International Bureau of WIPO, Geneva, Switzerland.
PCT/ISA/220.
PCT/ISA/210.
PCT/ISA/237.

* cited by examiner

HEAT DISTRIBUTION IN A DISTRIBUTED LIGHTING APPARATUS

The following invention relates to an apparatus for distributing heat about a distributed lighting apparatus, particularly for distributed lighting apparatus installed in the blades of wind turbines.

It is known that wind turbines can represent a hazard to aircraft since they extend into air space and in low light conditions are difficult to see. Lighting apparatus have therefore been developed for installation in wind turbines. These lighting apparatus make the wind turbines highly visible.

Known wind turbine lighting apparatus can be in the form of a distributed lighting apparatus. Distributed lighting apparatus provide illumination by guiding light from a source, along fibre optic cables and onwards to remote locations where the light can be emitted. This is preferable to more conventional lighting apparatus (e.g. where a power source transfers electrical energy along wires to a bulb) since it reduces the need for electrical wiring around the wind turbine structure and so reduces the risk of the turbine being struck by lightning. It also reduces weight.

However, in operation such apparatus encounter problems arising from the varying weather conditions to which they are exposed. Notably, water vapour can condense on the distributed lighting apparatus which can hamper the emission of light. If the temperature is sufficiently low, the condensed water vapour will freeze. In either case the wind turbine's visibility is consequently reduced and it becomes a hazard.

The condensation and freezing process depends on atmospheric conditions such as humidity and pressure as well as temperature differences between the distributed lighting apparatus and the atmosphere. On a cold morning for example, dew could form on the outside of the apparatus. On a hot day, condensation could occur on the inside or outside of the apparatus.

This condensation and/or freezing is a particular problem when it occurs in local proximity to the distributed lighting apparatus. This includes not only the surfaces of the distributed lighting apparatus itself, but also the nearby components of the wind turbine (for example a transparent cover). It is possible that if the condensation and/or freezing occurs on the local components, the emission of light from the distributed lighting system could be hampered.

The present invention is therefore concerned with providing a distributed lighting apparatus comprising a light source, a light emitter, and a light conduit communicating between the light source and light emitter, wherein the distributed lighting apparatus comprises a fluid conduit communicating between the light source and the light emitter so that the apparatus is capable of distributing heat about itself to inhibit the local condensation of water vapour and/or the local formation of ice.

Advantageously this invention therefore provides an apparatus for lighting a wind turbine which achieves all of the benefits of previous distributed lighting arrangements, and further to this is able to achieve them under the adverse conditions that apparatus will be subjected to when in use. It does this in an energy efficient way by making use of the thermal energy already present in the system.

Preferably the distributed lighting apparatus comprises a duct, the duct comprising both the fluid conduit and the light conduit.

Advantageously this makes installation easier since only one component need be laid between the light source and light emitter.

Preferably, the distributed lighting apparatus comprises a plurality of light conduits combined to form a consolidated light conduit, the consolidated light conduit defining a bore which can act as the fluid conduit.

Advantageously this makes efficient use of the materials. The apparatus can therefore be cheaper and lighter.

Preferably, optical fibres are used as light conduits.

These provide a light conduit that has a very low attenuation so that light can be effectively transferred from one location to another.

Preferably, the distributed lighting apparatus comprises a heating means for heating a fluid medium.

This can ensure that a fluid medium in the apparatus can be raised to a temperature which will inhibit the formation of ice.

Preferably, the light source comprises a power supply.

The provision of a power supply advantageously means that, as well as powering the light source, the light source can function as a heating means.

Preferably, the light source comprises a cluster of Light Emitting Diodes.

Advantageously a cluster of LED's are used since they are durable and resistant to shocks.

Preferably, the distributed lighting apparatus comprises a further fluid conduit between the light source and the light emitter so that a fluid medium can circulate between the light source and the light emitter.

Advantageously, this enables the heat to be distributed around a closed loop. This means that the fluid medium need not be sourced from the atmosphere but could in fact be provided as part of the apparatus if required. This would lead to reduced heat losses.

Preferably, the distributed lighting apparatus comprises a fluid propulsion means for effecting the circulation of a fluid medium.

Advantageously this can ensure that hot fluid will be transferred to the light emitter.

Preferably, the fluid propulsion means comprises a fan.

Preferably, the fluid medium is air.

The apparatus can therefore source its fluid medium from its surroundings. This is a cost-effective measure.

Preferably, the light emitter comprises a lens.

Advantageously this diffuses or focuses the emitted light in a predetermined way so that the light is as visible as possibly required.

Preferably, the lens comprises black absorbers.

Advantageously these increase the efficiency with which the lens absorbs infra-red radiation and so help to heat the lens.

Preferably, the distributed lighting apparatus is installed along a rotatable blade and a fluid medium can be driven by centrifuge action to effect the flow.

Advantageously, this obviates the requirement for a fluid driving means to be provided as part of the apparatus and so reduces manufacturing and assembly costs.

Preferably, the distributed lighting apparatus is suitable for installation in a plane wing tip with the light emitter located towards or at the tip of the wing.

In accordance with a further aspect of the invention, there is provided a method for distributing heat around a distributed lighting apparatus to inhibit the local condensation of water vapour and/or the local formation of ice, the distributed lighting apparatus comprising a light source, a light emitter, and a light conduit communicating between the light source and light emitter, the distributed lighting apparatus comprising a fluid conduit communicating between the light source and the light emitter, the method comprising the steps of warming a fluid medium at the light source and propelling the fluid medium along the fluid conduit to the light emitter.

In accordance with yet another aspect of the invention, there is provided a wing comprising a distributed lighting apparatus comprising a light source, a light emitter, and a light conduit communicating between the light source and light emitter, wherein the distributed lighting apparatus comprises a fluid conduit communicating between the light source and the light emitter so that the apparatus is capable of distributing heat about itself to inhibit the local condensation of water vapour and/or the local formation of ice.

In accordance with a still further aspect of the invention, there is provided a turbine blade for a wind turbine, the turbine blade comprising a distributed lighting apparatus comprising a light source, a light emitter, and a light conduit communicating between the light source and light emitter, wherein the distributed lighting apparatus comprises a fluid conduit communicating between the light source and the light emitter so that the apparatus is capable of distributing heat about itself to inhibit the local condensation of water vapour and/or the local formation of ice.

An embodiment of the present invention will now be described, by way of example only, with reference to the drawings of which:

Figure 1:
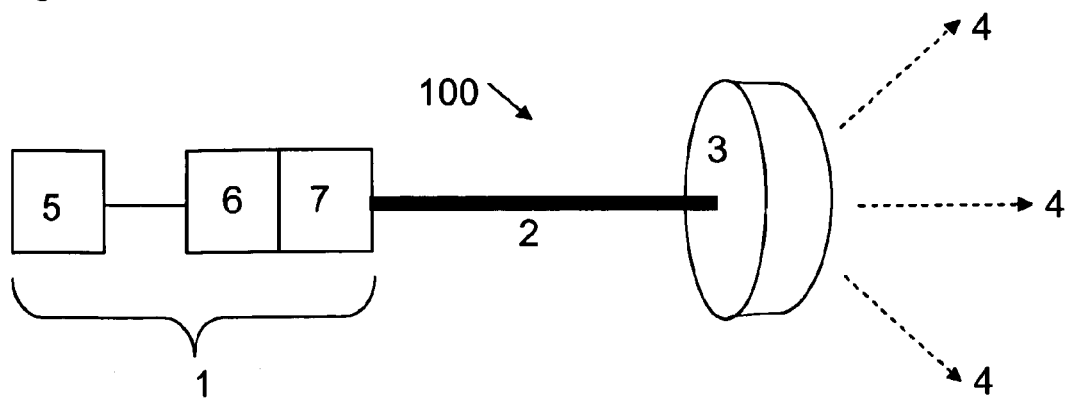
FIG. 1 shows a diagram illustrating an arrangement of the present invention according to one possible embodiment.

Referring to FIG. 1, an arrangement of a distributed lighting apparatus 100 is shown. Light travels from the light source 1 and along the light conduit 2 until it reaches the blade tip lens 3. The blade tip lens 3 acts as a light emitter since it is from here that light 4 is emitted from the apparatus 100 itself. In other words, an observer looking at the distributed lighting apparatus would see light shining only from the blade tip lens 3.

The light source 1 is shown comprising a power supply 5, LED cluster 6 and fibre launch optics 7. The power supply 5 is connected to a cluster of light emitting diodes (LED's) 6 so as to cause the LED's to emit light. Light emitted by the LED's is collected by fibre launch optics 7 and guided into the light conduit 2.

Figure 2:
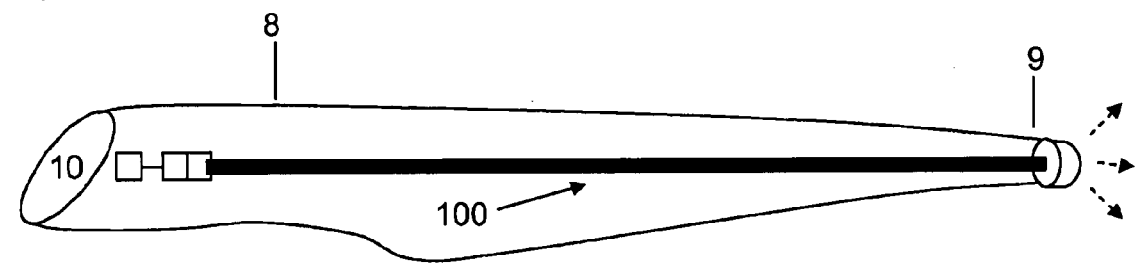
FIG. 2 shows the embodiment of FIG. 1 installed in a wind turbine blade.

FIG. 2 shows the distributed lighting apparatus of FIG. 1 installed in the blade 8 of a wind turbine (not shown). The light emitter 3 is positioned at the tip of the turbine blade 9 thereby increasing the visibility of the point on the turbine which extends furthest into the airspace. The light source 1 is positioned towards the root 10 of the blade 8. The light conduit 2 extends from the light source 1 to the light emitter 3 along the length of the blade 8.

Figure 3:
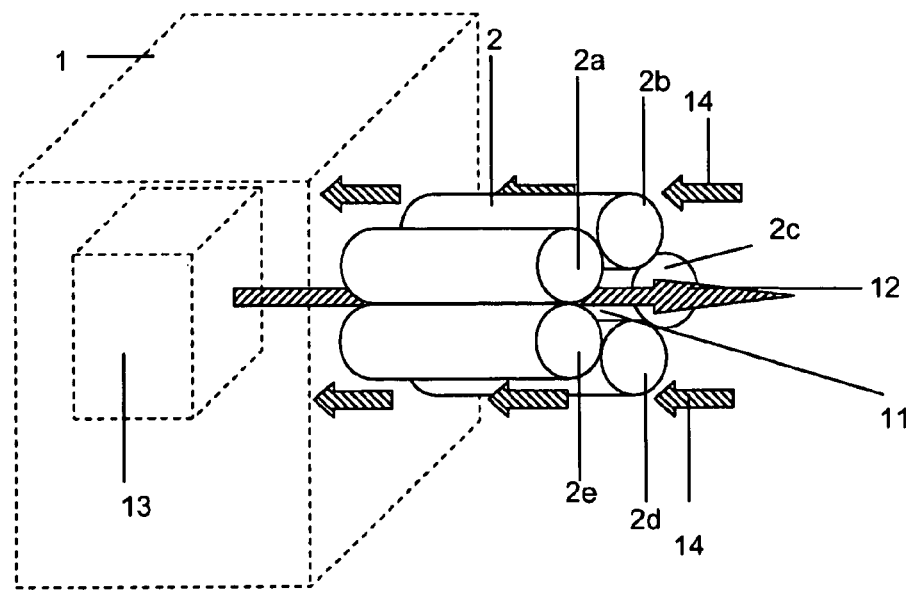
FIG. 3 shows a detail of the embodiment of FIG. 1.

Referring to FIG. 3, the light conduit 2 can be seen as comprising a number of distinct light conduits 2a-2e arranged in parallel, each of which guides the light. These are joined to define a bore 11 that runs the length of the light conduit 2. Bore 11, enables air to flow from around the light source 1, along the light conduit 2, and on to the light emitter 3. Fan 13 is provided for propelling air 12 along the bore 11 to the light emitter 3. The apparatus can be enclosed so that air can circulate between the source 1 and emitter 3.

It is important that neither ice nor condensation forms on the light emitter 12 surface so as to cover the emitter and reduce the visibility of the wind turbine. However, a wind turbine will be expected to function in conditions likely to induce ice formation and condensation.

Therefore, in operation, a fluid medium 12 is heated by the power supply 5 and propelled from the power supply 5 so that it flows along the fluid conduit 11 and onto the light emitter 3. At the emitter 3, the hot fluid medium 11 transfers thermal energy to the light emitter 3, this maintains the apparatus at a temperature greater than the dew point and so prevents condensation (and therefore ice) from forming which would obscure the emitter 3. Once the fluid medium 12 has reached the light emitter 3 it may return 14 about the periphery of the light conduit to the power supply to be re-heated.

By distributing the warm air from around the light source to the light emitter, the apparatus is in effect able to transfer heat from its warmer part to its colder parts.

The light conduits 10a-e are made of large core optic fibres.

The embodiment of the invention described herein should not be seen as limiting the scope of the invention. A number of variations on the described embodiment are possible without departing from the scope of the invention; such variations would be obvious to one skilled in the art.

For example, the fluid need not be air. Any fluid with a low viscosity and low density would be suitable. The fluid may be sourced from the surroundings or may be provided, in which case the apparatus would have to be encapsulated to prevent the provided fluid from escaping.

The invention need not rely upon the power supply to heat the fluid medium, a heating means such as an electric heating element may be additionally provided.

When using a consolidated conduit comprised of a number of lighting conduits joined to form a bore, the hot fluid may flow through the bore from the light source to the light emitter and then once it has warmed the light emitter may return on the outside of the consolidated conduit.

The converse would also be possible. In this case the hot fluid may flow on the outside of the consolidated conduit from the light source to the light emitter and then once it has warmed the light emitter may return through the bore. A means of enclosing the consolidate conduit could be provided to prevent the heated fluid from escaping.

The invention has been described with respect to a blade in a wind turbine, however the invention would be equally well suited to installation in the wing of a plane. Such an installation would be particularly suitable for use as a landing light with the light emitter located at the tip of the plane's wing.

The invention fluid propulsion means need not necessarily be a fan. For example, in a spinning turbine blade, air would tend to be forced from the power supply to the tip of the blade anyway by a 'centrifuge action'. This would also be an acceptable propulsion means within the scope of the invention.

The invention may even be installed in the rotor blade of a helicopter.

The invention claimed is:

1. A distributed lighting apparatus comprising a light source, a light emitter, and a consolidated light conduit communicating between the light source and light emitter, wherein the consolidated light conduit comprises a plurality of light conduits arranged to define a central bore that runs the length of the consolidated light conduit, wherein the bore is a fluid conduit that communicates a fluid medium between the light source and the light emitter so that the apparatus is capable of distributing heat about itself from the light source to the light emitter to inhibit at least one of the local condensation of water vapour and the local formation of ice.

2. The distributed lighting apparatus according to claim 1 comprising a heating means for heating the fluid medium.

3. The distributed lighting apparatus according to claim 2 wherein the fluid medium is a first fluid medium, and in which the distributed lighting apparatus comprises a further fluid conduit between the light source and the light emitter so that a second fluid medium can circulate between the light source and the light emitter.

4. The distributed lighting apparatus according to claim 1 in which the distributed lighting apparatus comprises a further fluid conduit between the light source and the light emitter so that the fluid medium can circulate between the light source and the light emitter.

5. The distributed lighting apparatus according to claim 4 in which the distributed lighting apparatus comprises a fluid propulsion means for effecting the circulation of the fluid medium.

6. The distributed lighting apparatus according to claim 1 in which the distributed lighting apparatus comprises a fluid propulsion means for effecting the circulation of the fluid medium.

7. The distributed lighting apparatus according to claim 6 in which the distributed lighting apparatus is installed along a rotatable blade and the fluid medium can be driven by centrifuge action to effect the flow.

8. The distributed lighting apparatus according to claim 1 in which the distributed lighting apparatus is installed along a length of a rotatable blade and the fluid medium can be driven by centrifuge action to effect the flow.

9. The distributed lighting apparatus according to claim 1 comprising a heating means for heating the fluid medium.

10. A method for distributing heat around a distributed lighting apparatus to inhibit the condensation of water vapour and/or the local formation of ice, the distributed lighting apparatus comprising a light source, a light emitter, and a consolidated light conduit communicating between the light source and light emitter, wherein the consolidated light conduit comprises a plurality of light conduits arranged to define a central bore that runs the length of the consolidated light conduit, and wherein the bore is a fluid conduit that communicates a fluid medium between the light source and the light emitter, the method comprising the steps of warming the fluid medium at the light source and propelling the fluid medium along the fluid conduit to the light emitter.

11. A wing comprising a distributed lighting apparatus comprising a light source, a light emitter, and a consolidated light conduit communicating between the light source and light emitter, wherein the consolidated light conduit comprises a plurality of light conduits arranged to define a central bore that runs the length of the wing wherein the bore is a fluid conduit that communicates a fluid medium communicating between the light source and the light emitter so that the apparatus is capable of distributing heat about itself from the light source to the light emitter to inhibit at least one of a local condensation of water vapour and a local formation of ice on the wing.

12. A turbine blade for a wind turbine, the turbine blade comprising a distributed lighting apparatus comprising a light source, a light emitter, and a consolidated light conduit communicating between the light source and light emitter, wherein consolidated light conduit comprises a plurality of light conduits arranged to define a central bore that runs the length of the turbine blade wherein the bore is a fluid conduit that communicates a fluid medium between the light source and the light emitter so that the apparatus is capable of distributing heat from the light source to the light emitter to inhibit at least one of a local condensation of water vapour and a local formation of ice.

* * * * *